United States Patent
Kikuchi et al.

(10) Patent No.: US 9,550,451 B2
(45) Date of Patent: Jan. 24, 2017

(54) CASE-EQUIPPED MECHANISM DEVICE

(71) Applicant: ALPS ELECTRIC CO., LTD., Tokyo (JP)

(72) Inventors: Tsuyoshi Kikuchi, Miyagi-ken (JP); Shunji Araki, Miyagi-ken (JP); Toshihiro Chubachi, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 12 days.

(21) Appl. No.: 14/723,958

(22) Filed: May 28, 2015

(65) Prior Publication Data

US 2015/0362946 A1 Dec. 17, 2015

(30) Foreign Application Priority Data

Jun. 12, 2014 (JP) ................................. 2014-121310

(51) Int. Cl.
*B60Q 1/34* (2006.01)
*B60Q 1/14* (2006.01)
*G05G 1/04* (2006.01)

(52) U.S. Cl.
CPC ............. *B60Q 1/343* (2013.01); *B60Q 1/1469* (2013.01); *G05G 1/04* (2013.01); *Y10T 74/20396* (2015.01)

(58) Field of Classification Search
CPC  H01H 25/04; H01H 2231/026; B60Q 1/1461; B60Q 1/1476; B60Q 1/1469; B60Q 1/343
USPC ........................................... 200/61.27, 61.54
See application file for complete search history.

(56) References Cited

U.S. PATENT DOCUMENTS

| | | | | |
|---|---|---|---|---|
| 5,742,014 A * | 4/1998 | Schwartz | ............. | B60Q 1/1469 200/61.27 |
| 8,334,470 B2 | 12/2012 | Sano | | |
| 2006/0185463 A1* | 8/2006 | Takahashi | ............ | B60Q 1/1469 74/504 |
| 2007/0000761 A1* | 1/2007 | Takahashi | ............ | B60Q 1/1461 200/61.54 |
| 2009/0139850 A1* | 6/2009 | Urakawa | ............. | B60Q 1/1469 200/6 A |

FOREIGN PATENT DOCUMENTS

| | | | | |
|---|---|---|---|---|
| EP | 1285813 A2 * | 2/2003 | ........... | B60Q 1/1461 |
| JP | 2011192392 A | 9/2011 | | |
| JP | 2012221583 A * | 11/2012 | | |

* cited by examiner

*Primary Examiner* — Ruth Ilan
(74) *Attorney, Agent, or Firm* — Brinks Gilson & Lione

(57) ABSTRACT

Ribs formed on two sides of a case are press-fitted into grooves formed in the holding faces of a holding member. Two case bodies constituting the case have rib divisions formed by dividing ribs in their longitudinal directions. Accordingly, the two case bodies are brought into contact with each other in a wide range on the divided surfaces of the rib divisions, the divided surfaces extending in the longitudinal directions. When the ribs are press-fitted into the grooves, the divided surfaces in contact with each other are brought into pressure-contact with each other in a wide range.

5 Claims, 8 Drawing Sheets

CASE-EQUIPPED MECHANISM DEVICE

CLAIM OF PRIORITY

This application claims benefit of priority to Japanese Patent Application No. 2014-121310 filed on Jun. 12, 2014, which is hereby incorporated by reference in its entirety.

BACKGROUND

1. Field of the Disclosure

The present disclosure relates to a case-equipped mechanism device in which part of mechanism parts is accommodated in the case. For example, the present disclosure relates to a vehicle-use lever device that uses a holder attached to a steering column or the like to hold a case in which a lever support body that swingably supports an operating lever is accommodated.

2. Description of the Related Art

Many passenger cars come with a lever device disposed in the vicinity of a steering wheel, the lever device being used as a mechanism device that operates the direction indicators, the headlights, the windshield wiper, and the like. A general lever device can swing the operating lever in two directions. For example, the vertical motion of the operating lever is detected as an operation for operating the direction indicators, and the fore-aft motion is detected as an operation for, for example, operating the headlight beams or the windshield wiper. As the swinging mechanism of this type of operating lever, Japanese Unexamined Patent Application Publication No. 2011-192392 describes a lever operating device that includes a movable support member that swingably supports the base of an operating lever and also includes a housing that swingably supports the movable support member. The operating lever is swingable with respect to the movable support member in a first operation plane and is also swingable with respect to the housing in a second operation plane perpendicular to the first operation plane.

In the lever operating device described in Japanese Unexamined Patent Application Publication No. 2011-192392 above, the housing is divided into two bodies, an upper case and a lower case. To attach the spindle of the movable support member to an axis retaining cutout in the housing, the housing needs to be structured so that it can be disassembled in this way. The housing is secured to a holder, in a prescribed shape, of the steering column. When the lever is operated, therefore, a strong force is applied to the axis retaining cutout, which supports the movable support member. This requires the housing to be highly rigid. With the lever operating device described above, the upper case and lower case are combined by causing the fasteners of the lower case to snap into engaging holes in the upper case. If higher strength is required than in snap engagement in which elasticity is used, additional measures such as, for example, securing the two cases together with screws are generally taken. However, the way in which additional measures such as screwing are taken is problematic in that the number of parts is increased and person-hours in assembling are increased.

SUMMARY

A case-equipped mechanism device includes a case that accommodates at least part of mechanism parts and also includes a holding member that has a holding space in which the case is held by being enclosed from the outside. The holding member has an opening into which the case is inserted and also includes a pair of holding faces that extend in parallel from the opening in the depth direction of the holding space, the pair of holding faces sandwiching two sides of the case. Each of the pair of holding faces has a groove formed so as to extend in the depth direction. A rib is formed on each of the two sides of the case sandwiched by the pair of holding faces; the rib is press-fitted into the relevant groove. The case is divided into two case bodies, each of which has one of rib divisions into which the rib is divided along its longitudinal direction.

In this structure, the two case bodies are brought into contact with each other in a wide rage on the divided surfaces of the rib divisions extending in the longitudinal direction. When the rib is press-fitted into the groove, the divided surfaces are brought into pressure contact with each other in a wide range. Since the rib, which is formed in each of the two sides of the case, is press-fitted into the groove in the relevant holding face, the rib divisions are brought into pressure-contact with each other in a wide range on the two sides of the case. Therefore, the two case bodies are more strongly combined into one member than in a snap-fitting method in which an elastic force is used.

DESCRIPTION OF THE EXEMPLARY EMBODIMENTS

The case-equipped mechanism device according to an embodiment of the present invention will be described with reference to FIGS. 1 to 7.

Figure 1:
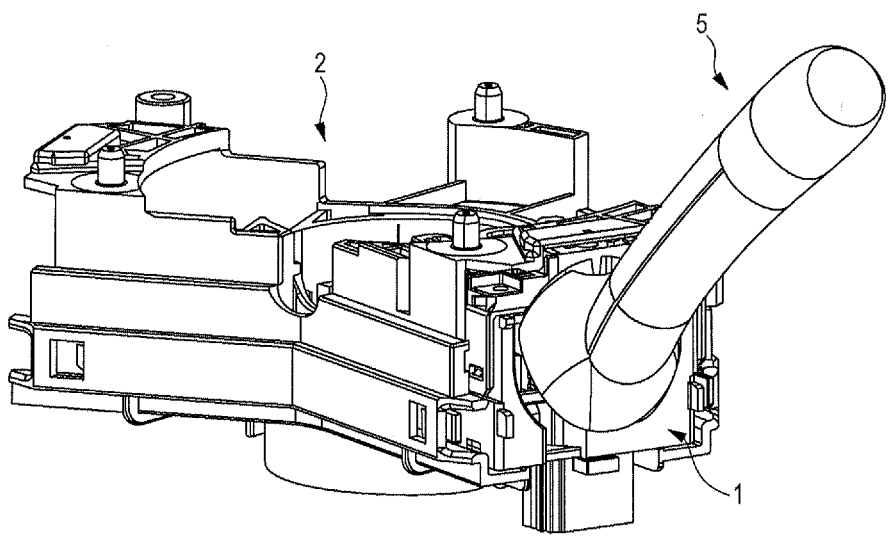
FIG. 1 is a perspective view illustrating an example of the case-equipped mechanism device according to an embodiment of the present invention, illustrating a state in which the case of a mechanism device including an operating lever is inserted into a holding member.
Figure 2:
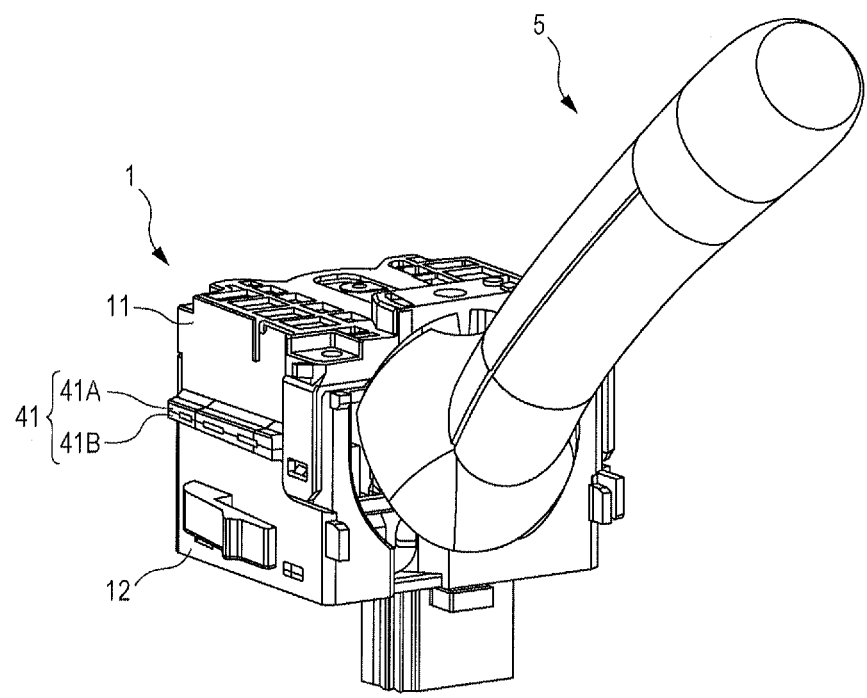
FIG. 2 is a perspective view illustrating an example of the mechanism device including the operating lever.
Figure 3:
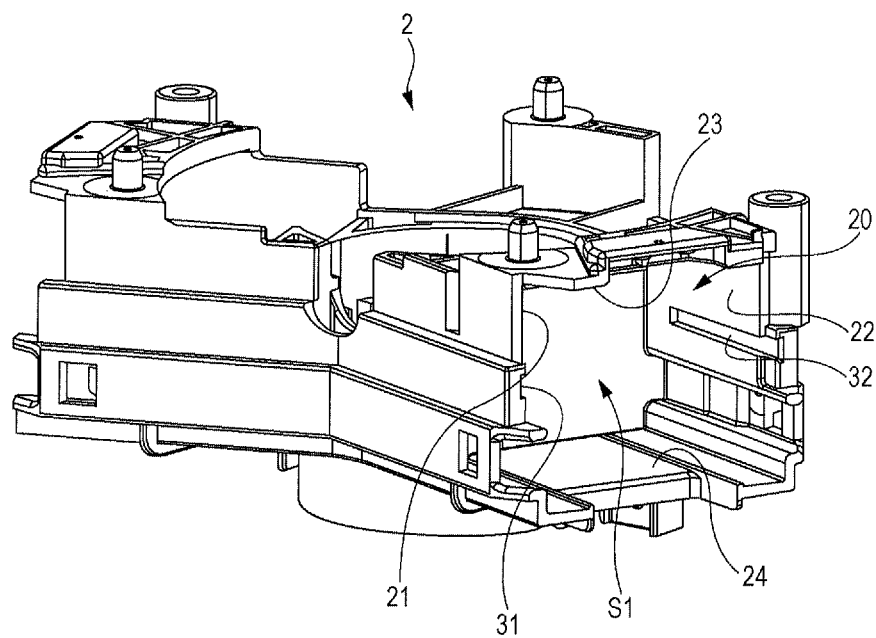
FIG. 3 is a perspective view illustrating an example of the holding member.
Figure 4:
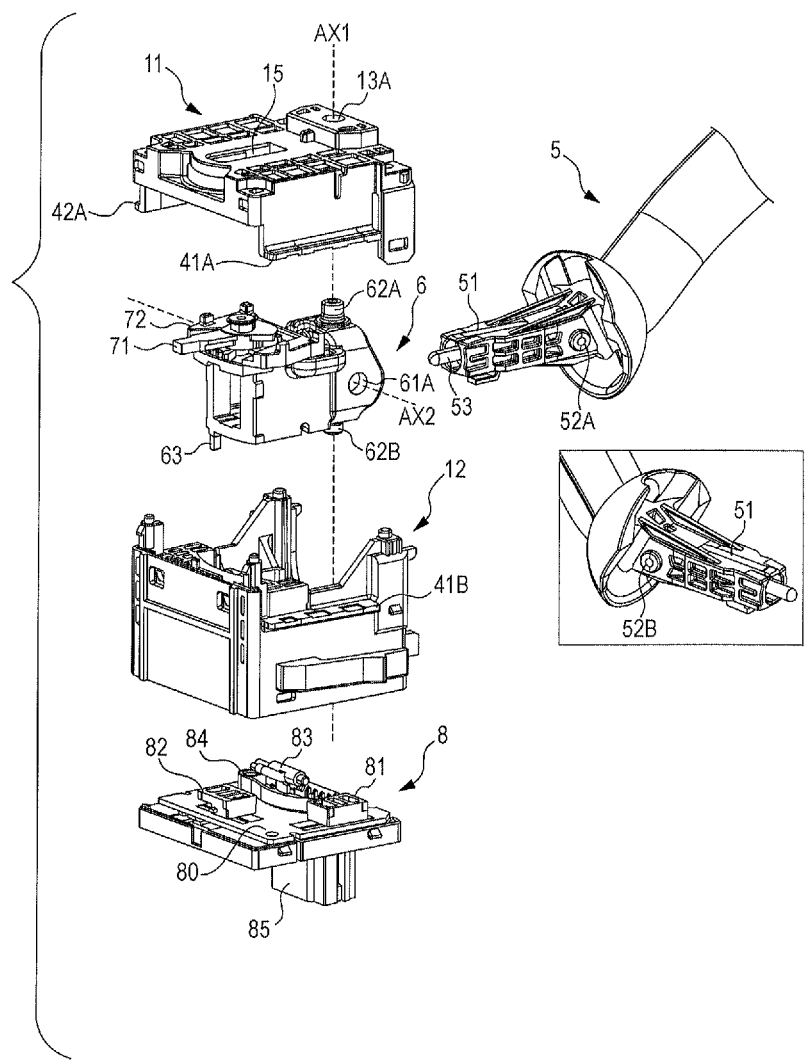
FIG. 4 is a first exploded perspective view of the mechanism device in FIG. 2.
Figure 5:
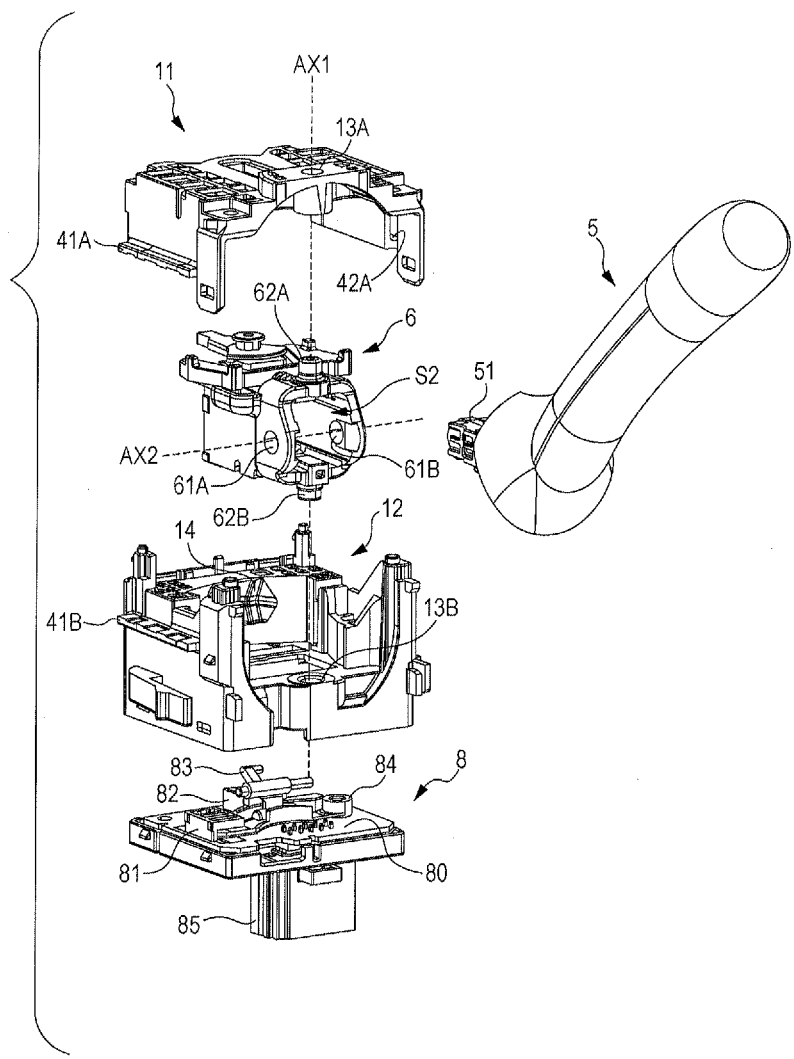
FIG. 5 is a second exploded perspective view of the mechanism device in FIG. 2.
Figure 6:
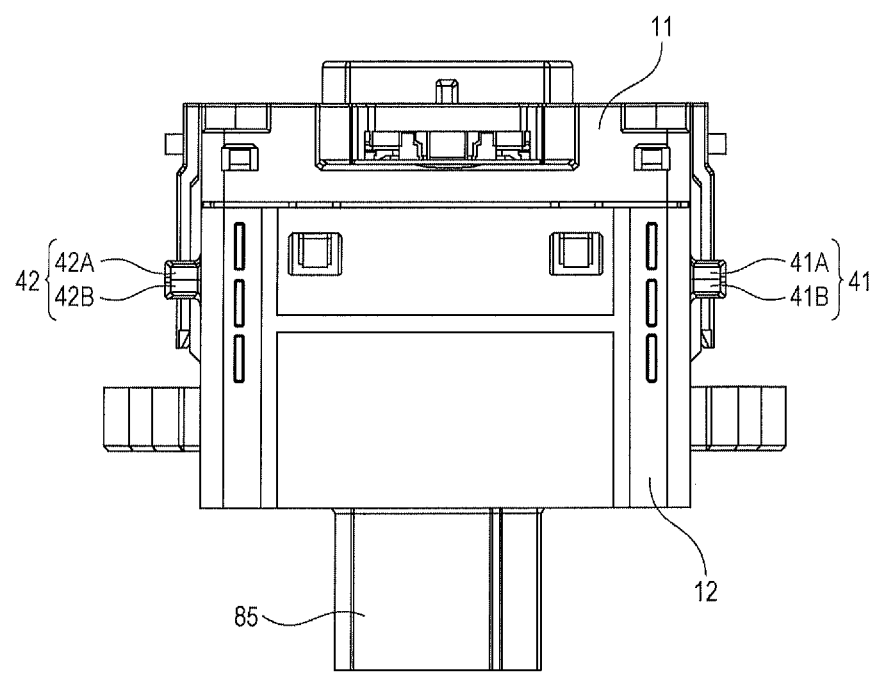
FIG. 6 is a front view of the mechanism device in FIG. 2, as viewed facing the front side when the mechanism device is inserted into the holding member.
Figure 7:
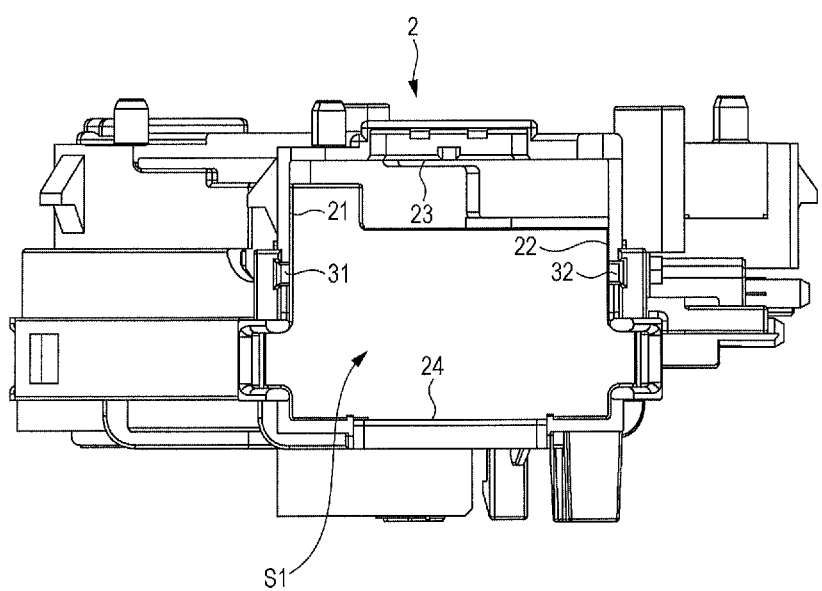
FIG. 7 is a front view of the holding member in FIG. 3, as viewed in its depth direction from an opening.

FIG. 1 is a perspective view illustrating an example of the case-equipped mechanism device according to an embodiment of the present invention, illustrating a state in which the case 1 of a mechanism device including an operating lever 5 is inserted into a holding member 2. FIG. 2 is a perspective view illustrating an example of the mechanism device including the operating lever 5. FIG. 3 is a perspective view illustrating an example of the holding member 2, illustrating a holding space S1 into which the case 1 of the mechanism device in FIG. 2 is inserted. FIGS. 4 and 5 are exploded perspective views illustrating examples of the case in FIG. 2, parts being viewed in different directions. FIG. 6 is a front view of the mechanism device in FIG. 2, as viewed facing the front side when the mechanism device is inserted into the holding member 2. FIG. 7 is a front view of the holding member 2 in FIG. 3, as viewed in its depth direction from an opening.

The case-equipped mechanism device illustrated in FIGS. 1 to 7 is a lever device that is used in a vehicle to operate direction indicators and the like. The case-equipped mechanism device has the mechanism device (see FIG. 2) including the operating lever 5 and also has the holding member 2 (see FIG. 3) used to hold the mechanism device in a steering column or the like.

As illustrated in FIGS. 2 and 4 to 6, the mechanism device including the operating lever 5 includes a lever support body 6 that supports the operating lever 5, a case 1, formed with two case bodies 11 and 12, that accommodates and supports the lever support body 6, and a switch unit 8 including a contact that is opened or closed according to the swinging operation of the operating lever 5.

In the example in these drawings, an acting member 51 inserted into an accommodating space S2 in the lever support body 6 is provided at one end of the operating lever 5. At the one end of the operating lever 5, a rod-like body is also provided that extends from the base of the acting member 51 while being slightly bent. The rod-like body is gradually thickened slightly toward its front end. A rotary switch and other electric parts are mounted in the interior of the outer cover of the rod-like body. These electric parts are connected to a circuit board 80, described later, in the switch unit 8 through a cable (not illustrated) and a flexible printed-circuit (FPC) board (not illustrated).

A hole is formed at the front end of the acting member 51. A presser 53 is accommodated in this hole together with a spring (not illustrated). The presser 53 is urged by the spring so as to protrude outwardly from the hole in the acting member 51. The round pointed end of the presser 53 protruding from the hole in the acting member 51 comes into elastic contact with a cam face 14 formed on an inner wall of the case body 12 of the case 1. When the presser 53 comes into elastic contact with the cam face 14, the urged force exerted on the operating lever 5 is removably retained.

A pair of rotation axes 52A and 523 are provided on two sides of the acting member 51 of the operating lever 5, one axis on each side, so as to be aligned on the same axial line (see FIG. 4). The rotation axes 52A and 52B are respectively supported by axis retaining holes 61A and 61B formed in the lever support body 6.

In the accommodating space S2 in the lever support body 6, the front end of the acting member 51 is accommodated. The axis retaining holes 61A and 61B, which respectively support the rotation axes 52A and 52B of the acting member 51 so as to be rotatable, are formed in the inside of the accommodating space S2. The rotation axes 52A and 52B are each, for example, a columnar protrusion formed on an outer surface of the acting member 51. The columnar inner walls of the rotation axes 61A and 61B support these protrusions. When the front end of the acting member 51 is accommodated in the accommodating space S2 of the lever support body 6, the rotation axes 52A and 52B of the acting member 51 are rotatably supported by the rotation axes 61A and 61B in the accommodating space S2. When the rotation axes 52A and 52B are supported by the rotation axes 61A and 61B, the operating lever 5 becomes swingable, centered around a second swing axis AX2. The second swing axis AX2 linearly passes through the rotation axes 61A and 61B and the rotation axes 52A and 52B.

A pair of rotation axes 62A and 62B are provided on the upper and lower outer surfaces of the lever support body 6, one axis on each outer surface, so as to be aligned on the same axial line. The rotation axis 62A is supported by an axis retaining hole 13A provided in the case body 11, which is one of the case bodies of the case 1. The rotation axis 62B is supported by an axis retaining hole 13B provided in the case body 12, which is the other of the case bodies of the case 1. The rotation axes 62A and 62B are each, for example, a columnar protrusion formed on an outer surface of the lever support body 6. The cylindrical inner walls of the axis retaining holes 13A and 13B support these protrusions. When the rotation axes 62A and 62B of the lever support body 6 are respectively supported by the axis retaining hole 13A in the case body 11 and the axis retaining hole 13B in the case body 12, the lever support body 6 becomes rotatable, centered around a first swing axis AX1. The operating lever 5 becomes rotatable through the lever support body 6, centered around the first swing axis AX1. The first swing axis AX1 linearly passes through the axis retaining holes 13A and 13B and rotation axes 62A and 62B.

The axis retaining holes 13A and 13B are each an example of the support unit of the present invention.

In the examples in FIGS. 4 and 5, the second swing axis AX2 passing the centers of the rotation axes 61A and 61B and rotation axes 52A and 52B and the first swing axis AX1 passing the centers of the axis retaining holes 13A and 13B and rotation axes 62A and 62B are substantially orthogonal to each other.

A cancel lever 71 is provided on the lever support body 6; the cancel lever 71 is a cancel mechanism that automatically restores the operating lever 5 to a predetermined orientation. The cancel lever 71 is urged by a spring (not illustrated) so that the cancel lever 71 protrudes toward the steering mechanism together with a support base 72. With the presser 53 at a predetermined neutral position on the cam face 14, the motion of the cancel lever 71 is restricted by the support base 72 and a guide hole 15 in the case 1, so the cancel lever 71 stays at a position distant from the steering mechanism. When the presser 53 is displaced from the neutral position, the cancel lever 71 protrudes toward the steering mechanism while being guided by the guide hole 15 and support base 72. After having protruded, the cancel lever 71 advances to the path of a cancel protrusion that moves due to the rotation of the steering wheel. When the cancel protrusion strikes against the cancel lever 71, the cancel lever 71 is pushed back toward the lever support body 6. The lever support body 6 is rotated due to the force with which the cancel lever 71 has been pushed back, returning the presser 53 to the neutral position. Thus, the operating lever 5 is automatically restored to the predetermined orientation due the rotation of the steering wheel.

The switch unit 8 includes the circuit board 80 attached to the outer bottom of the case body 12 in which the axis retaining hole 13B is formed, sliders 81 and 82 that linearly move on fixed contacts formed on the circuit board 80, a rotating member 84 that rotates on the circuit board 80, and a link member 83 that drives the rotating member 84 according to the swing of the acting member 51. The slider 81, which is linked to the rotating member 84, linearly moves in response to the swing of the acting member 51. The slider 82 engages a protrusion 63 on the lever support body 6. When the lever support body 6 rotates around the first swing axis AX1, the slider 82 linearly moves in response to the rotation of the lever support body 6. The sliders 81 and 82 each have a movable contact. When the sliders 81 and 82 linearly move, therefore, the states of connections between the fixed contacts and the movable contacts on the circuit board 80 changes (the contacts are opened or closed). Accordingly, the switch unit 8 creates contact-based on and off signals, according to the swing of the operating lever 5. These signals are output to the outside through a connector 85 provided on the circuit board 80.

The outer shape of the case 1 is hexahedral in a substantially box shape. The axis retaining holes 13A and 13B are formed in two opposite faces of the six faces. The case 1 also has an opening in one of the four faces other than the two faces in which the axis retaining holes 13A and 13B are formed. A portion, of the operating lever 5, that is not supported by the lever support body 6 extends toward the outside of the case 1 through this opening. The face opposite to the face having the opening is positioned at the backmost position in the holding space S1 in the holding member 2 in the depth direction of the holding space S1. The cancel lever 71 protrudes from this face.

With the case 1, ribs (elongated protrusions) 41 and 42 extending in the depth direction of the holding space S1 in the holding member 2 are formed on two opposite faces of the three faces other than the faces in which the axis retaining holes 13A and 13B and the opening are formed, one rib being formed on each face. The ribs 41 and 42, which are each a convex bump on the relevant face, substantially linearly extend. As illustrated in FIG. 6, the ribs 41 and 42 are formed at substantially symmetrical positions on the opposite faces (positions, on the opposite faces, that a normal common to these faces passes).

The widths of the ribs 41 and 42 are changed in a tapered shape, each width being a length in a direction perpendicular to the longitudinal direction of the rib 41 or 42, whichever is applicable. That is, the widths of the ribs 41 and 42 are gradually reduced toward the depth direction of the holding space S1 in the holding member 2.

The two case bodies 11 and 12, into which the case 1 is divided, have rib divisions 41A, 42A, 41B, and 42B into which the ribs 41 and 42 are divided in their longitudinal directions. Specifically, the case body 11 has the rib division 41A of the rib 41 and the rib division 42A of the rib 42, and the case body 12 has the rib division 412 of the rib 41 and the rib division 42B of the rib 42. In the example illustrated in the drawing, the rib divisions 41A and 41B have substantially the same length in their width directions perpendicular to their longitudinal directions, and the rib divisions 42A and 42B also have substantially the same length in their width directions perpendicular to their longitudinal directions.

The holding member 2 has the holding space S1 in which the case 1 is enclosed from the outside and is held, as illustrated in FIGS. 3 and 7. The holding member 2 in the example in these drawings has two holding spaces S1, in each of which the case 1 can be held, so that a mechanism device with two operating levers can be attached in the steering column.

The holding space S1 has four holding faces 21, 22, 23, and 24 that hold the case 1 by enclosing four faces of the case 1, which is hexahedral in a substantially box shape. The holding faces 21 and 22 are oppositely disposed, and the holding faces 23 and 24 are oppositely disposed. The opposite holding faces 21 and 22 extend from the opening 20 of the holding space S1 in parallel in the depth direction. The opposite holding faces 23 and 24 similarly extend in parallel. The holding faces 21 and 22 hold the right and left faces, of the case 1, on which the ribs 41 and 42 are respectively formed. The holding faces 23 and 24 hold the upper and lower faces, of the case 1, in which the axis retaining holes 13A and 13B are respectively formed.

The holding faces 21 and 22 respectively have grooves 31 and 32 into which the ribs 41 and 42 formed on the right and left faces of the case 1 are respectively press-fitted. The grooves 31 and 32 are formed so as to extend from the opening 20 of the holding space S1 in its depth direction. The widths of the grooves 31 and 32 (lengths in a direction perpendicular to the depth direction) are gradually reduced toward the depth direction of the holding space S1 in the holding member 2, as with the ribs 41 and 42.

Figure 8A:
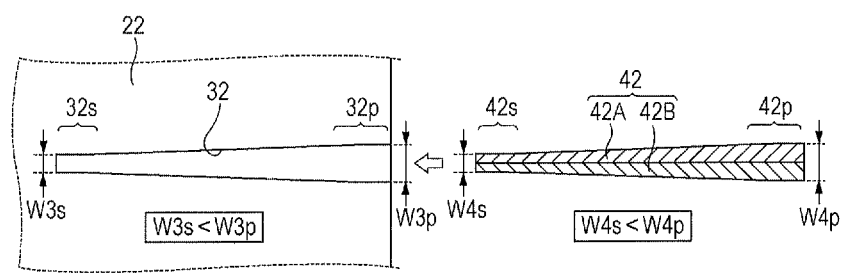
FIGS. 8A and 8B illustrate the shape of a groove formed in a holding face of the holding member and the shape of a rib, on the case, which is press-fitted into the groove, FIG. 8A illustrating a state before the rib is press-fitted into the groove, FIG. 8B illustrating a state after the rib has been press-fitted into the groove.
Figure 8B:
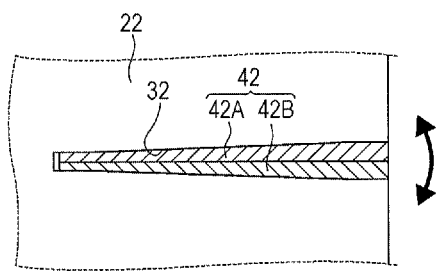

FIGS. 8A and 8B illustrate the shape of the groove 32 formed in the holding face 22 and the shape of the rib 42, on the case 1, which is press-fitted into the groove 32. FIG. 8A illustrates a state before the rib 42 is press-fitted into the groove 32, and FIG. 8B illustrates a state after the rib 42 has been press-fitted into the groove 32. As seen from FIGS. 8A and 8B, the width of the groove 32 at the back of the holding space S1 differs from that at its opening 20. Specifically, the width W3$s$ of the groove 32 at its end 32$s$ at the back of the holding space S1 is smaller than the width W3$p$ of the groove 32 at its end 32$p$ at the opening 20 (W3$s$<W3$p$). Between the end 32$p$ and the end 32$s$, the width of the groove 32 is gradually reduced from the end 32$p$ toward the end 32$s$ in a tapered shape. The width of the rib 42 also differs between the back of the holding space S1 and its opening 20. The width W4$s$ of the rib 42 at its end 42$s$ located at the back of the holding space S1 after press-fitting is smaller than the width W4$p$ of the rib 42 at its end 42$p$ located at the opening 20 after press-fitting (W4$s$<W4$p$). Between the end 42$p$ and the end 42$s$, the width of the rib 42 is gradually reduced from the end 42$p$ toward the end 42$s$ in a tapered shape.

When the rib 42 is press-fitted into the groove 32, the upper and lower outer surfaces of the rib 42 respectively come into tight contact with the upper and lower inner surfaces of the groove 32, as illustrated in FIG. 8B. The two rib divisions 42A and 42B constituting the rib 42 are strongly pressed upwardly and downwardly by the inner surfaces of the groove 32. When the operating lever 5 is operated upwardly or downwardly, an upward or downward load is applied to the rib 42 as indicated by the bold line in FIG. 8B. Since the rib 42 is strongly pressed upwardly and downwardly by the inner surfaces of the groove 32, however, the two rib divisions 42A and 42B remain combined into one member.

When the groove 32 and rib 42 are tapered as described above, if the width W3$s$ of the groove 32 and the width W4$s$ of the rib 42 at the back of the holding space S1 and the width W3$p$ of the groove 32 and the width W4$p$ of the rib 42 at the opening 20 of the holding space S1 are set to appropriate dimensions, a strength needed for holding is maintained and a force needed for press-fitting is reduced. If the groove 32 and rib 42 are sufficiently long so that after being press-fitted, they are in contact with each other in a wide area, even if a load generated by the upward or downward motion of the operating lever 5 is exerted on the rib 42, the two rib divisions 42A and 42B remain strongly combined into one member.

Although the above description applies to the groove 32 and rib 42, it is also true for their associated groove 31 and rib 41 because they are also shaped as in FIG. 8. With the rib 41 press-fitted into the groove 31, the two rib divisions 41A and 410 remain strongly combined into one member due to an effect as described above.

As described above, with the case-equipped mechanism device according to this embodiment, the operating lever 5 is supported in the lever support body 6 so as to be swingable around the second swing axis AX2 and is also supported in the case 1 through the lever support body 6 so as to be swingable around the first swing axis AX1. In the holding member 2, the case 1 is held by being enclosed by the holding faces 21, 22, 23, and 24 from the outside. When the operating lever 5 is swung, therefore, in the case 1, strong external forces are applied to the two axis retaining holes 13A and 13B (a pair of support units), which support the lever support body 6. Since the two axis retaining holes 13A and 13B are respectively formed in the two case bodies 11 and 12 constituting the case 1, the external forces are exerted in directions in which the two case bodies 11 and 12 are separated.

With the case-equipped mechanism device according to this embodiment, however, the ribs 41 and 42 are formed on two sides of the case 1, one rib on each side. The 41 and 42 are respectively press-fitted into the grooves 31 and 32, which are respectively formed in the holding faces 21 and 22 of the holding member 2. The two case bodies 11 and 12 constituting the case 1 respectively have the rib divisions 41A and 42A and the rib divisions 41B and 42B, the rib divisions 41A and 41B being obtained by dividing the rib 41 in its longitudinal direction, the rib divisions 42A and 42B being obtained by dividing the rib 42 in its longitudinal direction. On the divided surfaces, of the rib divisions, that extend in their longitudinal directions (specifically, on the divided surfaces of the rib divisions 41A and 41B and on the divided surfaces of the rib divisions 42A and 42B), therefore, the two case bodies 11 and 12 are brought into contact with each other in a wide range. When the rib 41 is press-fitted into the groove 31, the divided surfaces 41A and 41B are brought into pressure contact with each other. Similarly, when the rib 42 is press-fitted into the groove 32, the divided surfaces 42A and 42B are brought into pressure contact with each other. Furthermore, since the ribs 41 and 42 are formed on the two sides of the case 1, one rib on each side, and the ribs 41 and 42 are respectively press-fitted into the grooves 31 and 32, which are respectively formed in the holding faces 21 and 22, the rib divisions are press-fitted in a wide range on the two sides of the case 1. Even in a case in which an external force is applied by a swing operation as described above, therefore, the two case bodies 11 and 12 can be strongly combined into one member, without taking additional measures for securing such as screwing. Accordingly, it is possible to reduce the number of parts and person-hours in assembling when compared with in a snap-fitting method in which screwing is needed.

With the case-equipped mechanism device according to this embodiment, the widths of the grooves 31 and 32 and the widths of the ribs 41 and 42 are gradually reduced toward in the depth direction of the holding space S1. Accordingly, the deeper the case 1 is inserted in the depth direction from the opening 20 in the holding member 2, the higher the pressure is under which the two case bodies 11 and 12 are brought into contact with each other on the divided surfaces of the rib divisions (specifically, on the divided surfaces of the rib divisions 41A and 41B and on the divided surfaces of the rib divisions 42A and 42B). Therefore, a force required at the initial time of press-fitting can be reduced, and the two case bodies 11 and 12 can also be strongly combined into one member by inserting the case 1 into the holding space S1.

In addition, with the case-equipped mechanism device according to this embodiment, the lever support body 6 is supported in the axis retaining holes 13A and 133 in the case 1 so as to be swingable around the first swing axis AX1, which is parallel to the holding faces 21 and 22 of the holding member 2 and is perpendicular to the depth direction of the holding space S1. That is, the direction of the first swing axis AX1 that swingably supports the lever support body 6 substantially matches the direction of the force with which the divided surfaces of the rib divisions are press-fitted when the ribs 41 and 42 are respectively press-fitted into the grooves 31 and 32. Accordingly, even if a strong external force is applied to the axis retaining holes 13A and 13B in the case 1 when the operating lever 5 is operated, a force that suppress the two case bodies 11 and 12 from being separated can be strongly exerted on the divided surfaces of the rib divisions, so the first swing axis AX1 can be kept stable by the axis retaining holes 13A and 13B and its deviation and rattling can be suppressed.

This completes the descriptions of some embodiments of the present invention, but the present invention is not limited to the embodiments described above; various variations are also applicable.

For example, although, in the above embodiments, the widths of the ribs 41 and 42 formed on two sides of the case 1 and the widths of the grooves 31 and 32 respectively formed in the holding faces 21 and 22 of the holding member 2 are gradually reduced toward the depth direction of the holding space S1 in a tapered shape, the present invention is not limited to this. In another embodiment of the present invention, only the widths of ribs formed on a case or only the widths of grooves formed in holding faces may be changed in a tapered shape.

Although, the above embodiments have taken an example of the case-equipped mechanism device (lever device) in which the case 1, in which a mechanism part involved in the swinging operation of the operating lever 5 is accommodated and supported, is supported by the holding member 2, the present invention is not limited to this. That is, a mechanism part is accommodated in the case and supported thereby is not limited to a mechanism part involved in the swinging operation of an operating lever. The present invention can be widely applicable to arbitrary mechanism parts, particularly, to arbitrary mechanism parts on which a force with which two case bodies constituting a case are separated is exerted.

What is claimed is:

1. A case-equipped mechanism device comprising:
a case that accommodates at least part of mechanism parts; and
a holding member that has a holding space in which the case is held by being enclosed from an outside; wherein the holding member includes:
an opening into which the case is inserted, and
a pair of holding faces that extend in parallel from the opening in a depth direction of the holding space, the pair of holding faces sandwiching two sides of the case,
each of the pair of holding faces has a groove that extends in the depth direction,
wherein, a rib is located on each of the two sides of the case sandwiched by the pair of holding faces, each of the ribs being press-fitted into a respective one of grooves, and
wherein, each rib is divided into two rib divisions along a longitudinal direction of the rib, and the case is divided into two case bodies, so that for each rib, one of the rib divisions is located on one of the case bodies and the other of the rib divisions is located on the other of the case bodies.

2. The case-equipped mechanism device according to claim 1, wherein at least one of a width of the grooves and a width of the ribs is gradually narrowed toward the depth direction.

3. The case-equipped mechanism device according to claim 1, wherein:
the mechanism parts include:
an operating lever, and
a lever support body that supports the operating lever;
the case includes a pair of support units that swingably support the lever support body;
one of the pair of support units on one of the two case bodies; and
another of the pair of support units on another of the two case bodies.

4. The case-equipped mechanism device according to claim 3, wherein the pair of support units swingably support the lever support body, centered around a first swinging axis that is parallel to the pair of holding faces and is perpendicular to the depth direction.

5. The case-equipped mechanism device according to claim 4, wherein the lever support body swingably supports the operating lever, centered around a second swinging axis that is perpendicular to the first swinging axis.

* * * * *